(12) United States Patent
Saez

(10) Patent No.: US 10,088,911 B2
(45) Date of Patent: Oct. 2, 2018

(54) PROGRAMMABLE ELECTRONIC HELMET

(71) Applicant: Manuel Saez, Brooklyn, NY (US)

(72) Inventor: Manuel Saez, Brooklyn, NY (US)

(*) Notice: Subject to any disclaimer, the term of this patent is extended or adjusted under 35 U.S.C. 154(b) by 0 days.

(21) Appl. No.: 15/395,112

(22) Filed: Dec. 30, 2016

(65) Prior Publication Data

US 2018/0188813 A1 Jul. 5, 2018

(51) Int. Cl.
| | |
|---|---|
| *G09G 5/00* | (2006.01) |
| *G06F 3/01* | (2006.01) |
| *A42B 3/04* | (2006.01) |
| *A42B 3/30* | (2006.01) |
| *A42B 3/28* | (2006.01) |
| *A42B 3/22* | (2006.01) |
| *G06F 3/00* | (2006.01) |

(52) U.S. Cl.
CPC .............. *G06F 3/017* (2013.01); *A42B 3/044* (2013.01); *A42B 3/0426* (2013.01); *A42B 3/0453* (2013.01); *A42B 3/22* (2013.01); *A42B 3/283* (2013.01); *A42B 3/303* (2013.01); *G06F 3/005* (2013.01); *G06F 3/012* (2013.01)

(58) Field of Classification Search
CPC .......... G06F 3/005; G06F 3/012; G06F 3/017; A42B 3/22; A42B 3/044; A42B 3/0283; A42B 3/308; A42B 3/0426; A42B 3/0453
USPC .............. 345/8, 174, 633; 340/905; 600/301
See application file for complete search history.

(56) References Cited

U.S. PATENT DOCUMENTS

| | | | | |
|---|---|---|---|---|
| 2,420,351 | A | * | 5/1947 | Brown .................... H01H 35/14 200/61.48 |
| 5,577,981 | A | | 11/1996 | Jarvik |
| 7,401,920 | B1 | | 7/2008 | Kranz et al. |
| 7,570,301 | B2 | | 8/2009 | Gilor |
| 7,710,654 | B2 | | 5/2010 | Ashkenazi et al. |
| 7,810,750 | B2 | | 10/2010 | Abreu |
| 7,972,245 | B2 | | 7/2011 | Temple et al. |
| 8,467,133 | B2 | | 6/2013 | Miller |
| 8,472,120 | B2 | | 6/2013 | Border et al. |
| 8,477,425 | B2 | | 7/2013 | Border et al. |
| 8,482,859 | B2 | | 7/2013 | Border et al. |

(Continued)

FOREIGN PATENT DOCUMENTS

| | | |
|---|---|---|
| CA | 2896985 A1 | 7/2014 |
| CN | 103946732 A | 7/2014 |

(Continued)

*Primary Examiner* — Prabodh M Dharia
(74) *Attorney, Agent, or Firm* — Gearhart Law LLC

(57) ABSTRACT

A programmable electronic helmet and a method of using the helmet are provided. The programmable electronic helmet includes a hard frame strappable to a head of a user, at least one gyroscope, an accelerometer, a user interface, at least one camera positioned on the hard frame, a display positioned a location that is in the peripheral field of vision of the user, wherein the display is configured to communicate information to the user, and a wireless communication apparatus. The programmable electronic helmet further includes one or more processors, wherein the one or more processors are configured to analyze images captured by the at least one camera to approximate a location of one or more objects in an area surrounding the user, and a memory, coupled to the processor, configured to store data acquired by and sent to the programmable helmet.

19 Claims, 20 Drawing Sheets

(56) References Cited

U.S. PATENT DOCUMENTS

| | | | |
|---|---|---|---|
| 8,488,246 B2 | 7/2013 | Border et al. | |
| 8,540,363 B2 | 9/2013 | Abreu | |
| 8,860,570 B2 | 10/2014 | Thomas et al. | |
| 8,964,298 B2 | 2/2015 | Haddick et al. | |
| 9,097,890 B2 | 8/2015 | Miller et al. | |
| 9,097,891 B2 | 8/2015 | Border et al. | |
| 9,124,196 B1* | 9/2015 | Honein | H02N 15/00 |
| 9,128,281 B2 | 9/2015 | Osterhout et al. | |
| 9,129,295 B2 | 9/2015 | Border et al. | |
| 9,134,534 B2 | 9/2015 | Border et al. | |
| 9,182,596 B2 | 11/2015 | Border et al. | |
| 9,223,134 B2 | 12/2015 | Miller et al. | |
| 9,229,227 B2 | 1/2016 | Border et al. | |
| 9,285,589 B2 | 3/2016 | Osterhout et al. | |
| 9,298,986 B2 | 3/2016 | Ferlatte et al. | |
| 9,341,843 B2 | 5/2016 | Border et al. | |
| 9,366,862 B2 | 6/2016 | Haddick et al. | |
| 9,451,802 B2 | 9/2016 | Shearman et al. | |
| 9,504,287 B1* | 11/2016 | Guffin, III | A42B 3/185 |
| 9,550,418 B1* | 1/2017 | Logan | B60K 28/10 |
| 2006/0072007 A1 | 4/2006 | Gilor | |
| 2006/0238877 A1 | 10/2006 | Ashkenazi et al. | |
| 2008/0143954 A1 | 6/2008 | Abreu | |
| 2010/0222179 A1 | 9/2010 | Temple et al. | |
| 2010/0253501 A1* | 10/2010 | Gibson | A41D 13/01 340/475 |
| 2011/0051982 A1 | 3/2011 | Abreu | |
| 2011/0057781 A1* | 3/2011 | Lee | A42B 3/0453 340/432 |
| 2011/0167542 A1* | 7/2011 | Bayne | A42B 3/14 2/416 |
| 2012/0075168 A1 | 3/2012 | Osterhout et al. | |
| 2012/0142415 A1 | 6/2012 | Lindsay | |
| 2012/0194418 A1 | 8/2012 | Osterhout et al. | |
| 2012/0194419 A1 | 8/2012 | Osterhout et al. | |
| 2012/0194420 A1 | 8/2012 | Osterhout et al. | |
| 2012/0194549 A1 | 8/2012 | Osterhout et al. | |
| 2012/0194550 A1 | 8/2012 | Osterhout et al. | |
| 2012/0194551 A1 | 8/2012 | Osterhout et al. | |
| 2012/0194552 A1 | 8/2012 | Osterhout et al. | |
| 2012/0194553 A1 | 8/2012 | Osterhout et al. | |
| 2012/0200488 A1 | 8/2012 | Osterhout et al. | |
| 2012/0200499 A1 | 8/2012 | Osterhout et al. | |
| 2012/0200601 A1 | 8/2012 | Osterhout et al. | |
| 2012/0206322 A1 | 8/2012 | Osterhout et al. | |
| 2012/0206323 A1 | 8/2012 | Osterhout et al. | |
| 2012/0206334 A1 | 8/2012 | Osterhout et al. | |
| 2012/0206335 A1 | 8/2012 | Osterhout et al. | |
| 2012/0206485 A1 | 8/2012 | Osterhout et al. | |
| 2012/0212398 A1 | 8/2012 | Border et al. | |
| 2012/0212399 A1 | 8/2012 | Border et al. | |
| 2012/0212400 A1* | 8/2012 | Border | G02B 27/017 345/8 |
| 2012/0212406 A1 | 8/2012 | Osterhout et al. | |
| 2012/0212414 A1 | 8/2012 | Osterhout et al. | |
| 2012/0212484 A1 | 8/2012 | Haddick et al. | |
| 2012/0212499 A1 | 8/2012 | Haddick et al. | |
| 2012/0218172 A1 | 8/2012 | Border et al. | |
| 2012/0218301 A1 | 8/2012 | Miller | |
| 2012/0235883 A1 | 9/2012 | Border et al. | |
| 2012/0235884 A1 | 9/2012 | Miller et al. | |
| 2012/0235885 A1 | 9/2012 | Miller et al. | |
| 2012/0235886 A1 | 9/2012 | Border et al. | |
| 2012/0235887 A1 | 9/2012 | Border et al. | |
| 2012/0235900 A1 | 9/2012 | Border et al. | |
| 2012/0236030 A1 | 9/2012 | Border et al. | |
| 2012/0236031 A1 | 9/2012 | Haddick et al. | |
| 2012/0242678 A1 | 9/2012 | Border et al. | |
| 2012/0242697 A1 | 9/2012 | Border et al. | |
| 2012/0242698 A1 | 9/2012 | Haddick et al. | |
| 2012/0249797 A1 | 10/2012 | Haddick et al. | |
| 2013/0127980 A1 | 5/2013 | Haddick et al. | |
| 2013/0148861 A1 | 6/2013 | Ferlatte et al. | |
| 2013/0214939 A1 | 8/2013 | Washlow et al. | |
| 2013/0276538 A1 | 10/2013 | Smith | |
| 2013/0278631 A1 | 10/2013 | Border et al. | |
| 2013/0314303 A1 | 11/2013 | Osterhout et al. | |
| 2014/0022620 A1* | 1/2014 | Baur | B60R 1/082 359/267 |
| 2014/0063054 A1 | 3/2014 | Osterhout et al. | |
| 2014/0063055 A1 | 3/2014 | Osterhout et al. | |
| 2014/0078462 A1 | 3/2014 | Abreu | |
| 2014/0134900 A1* | 5/2014 | Derrah | B63B 35/7943 440/6 |
| 2014/0167986 A1* | 6/2014 | Parada | G01C 21/365 340/905 |
| 2014/0184496 A1 | 7/2014 | Gribetz et al. | |
| 2014/0188010 A1 | 7/2014 | Paris et al. | |
| 2014/0267615 A1 | 9/2014 | Tapia et al. | |
| 2014/0362110 A1* | 12/2014 | Stafford | G06F 3/013 345/633 |
| 2015/0196252 A1* | 7/2015 | Iuliano | A61B 5/6803 600/301 |
| 2015/0220157 A1 | 8/2015 | Marggraff et al. | |
| 2015/0234189 A1* | 8/2015 | Lyons | G02B 27/0172 345/174 |
| 2015/0243100 A1 | 8/2015 | Abovitz et al. | |
| 2015/0309316 A1 | 10/2015 | Osterhout et al. | |
| 2015/0313496 A1 | 11/2015 | Connor | |
| 2016/0037849 A1 | 2/2016 | Shearman et al. | |
| 2016/0044276 A1 | 2/2016 | Shearman et al. | |
| 2016/0185280 A1* | 6/2016 | Coles | B60Q 1/2676 340/432 |
| 2016/0187654 A1 | 6/2016 | Border et al. | |
| 2016/0209648 A1 | 7/2016 | Haddick et al. | |
| 2016/0214015 A1* | 7/2016 | Osman | A63F 13/213 |
| 2016/0274244 A1* | 9/2016 | Dhaliwal | G01S 19/428 |
| 2016/0286115 A1* | 9/2016 | Levy | G02B 27/0172 |
| 2016/0309827 A1 | 10/2016 | Dodson | |
| 2017/0072840 A1* | 3/2017 | Mossadeghpour | A42B 3/0453 |
| 2017/0176746 A1* | 6/2017 | Weller | G02B 27/0172 |
| 2017/0262049 A1* | 9/2017 | Kim | G02B 27/017 |
| 2017/0344114 A1* | 11/2017 | Osterhout | G06F 3/017 |

FOREIGN PATENT DOCUMENTS

| | | |
|---|---|---|
| JP | 2015504616 A | 2/2015 |
| WO | WO9705926 A1 | 2/1997 |
| WO | WO2004099851 A2 | 11/2004 |
| WO | WO2007081745 A2 | 7/2007 |
| WO | WO2012037290 A2 | 3/2012 |
| WO | WO2013049248 A2 | 4/2013 |
| WO | WO2013163328 A1 | 10/2013 |
| WO | WO2014106823 A2 | 7/2014 |
| WO | WO2015103444 A1 | 7/2015 |
| WO | WO2015192117 A1 | 12/2015 |
| WO | WO2016006951 A2 | 1/2016 |
| WO | WO2016022984 A2 | 2/2016 |

* cited by examiner

PROGRAMMABLE ELECTRONIC HELMET

CLAIM OF PRIORITY

This application is a United States non-provisional application and claims no priority to any previous United States patent or patent application.

FIELD OF THE EMBODIMENTS

This invention relates to helmets and, in particular, to electronic helmets having programmable functions.

BACKGROUND OF THE EMBODIMENTS

Use of bicycles, scooters, skateboards, and other personal mobility vehicles is on the rise. Whether for basic transportation, for a working commute, for deliveries, and/or for recreation, these modes of transportation have seen a rise in use in recent years.

These modes of transportation often provide no external protection to a user riding the personal mobility vehicles. Furthermore, unlike cars, trucks, or other similar modes of transportation, there is often no place to safely access a mobile electronic device while safely maneuvering the personal mobility vehicles.

With the rise of advanced wireless communication devices, a safe means of accessing these devices, or using their functions, while driving a personal mobility vehicle is thus needed. Since these modes of transportation often require a helmet for protection, a means of incorporating smart technology into a helmet is needed in this growing transportation field.

Examples of related art are described below:

U.S. Pat. No. 7,570,301 generally describes devices, systems and methods of mounting audio/video capturing equipment. For example, a mounting device for mounting equipment onto a helmet includes: a support structure having one or more gripping mechanisms adapted to be fitted to one or more locations of the helmet; and a camera mount, at a first location of the support structure, to support a camera at a desired image-capturing position.

U.S. Pat. No. 8,860,570 generally describes a system for sensing, analyzing and reporting a collision event experienced by a person or object sensor module designed to a person or object, module angular velocities over time and a processor for analyzing the sensed velocities, calculating properties of angular velocities, such as jerk and jolt, comparing these properties with threshold values selected to correlate to predicted severities of injury to the person or object, transmitting information regarding these properties to communication device user-designated persons. Also provided are group tracking and communication devices for use by monitors to manage multiple persons equipped with sensor modules. The sensor modules and group tracking and communication devices are designed to be portable, attachable and detachable so that they can be attached to different types of gear used by persons engaging in different activities.

U.S. Pat. No. 9,451,802 generally describes a method for recording accidents that includes: in a first mode, capturing a second video frame at a second time, storing the second video frame with a first sequence of video frames, captured over a buffer duration, in local memory in the helmet, removing a first video frame captured outside of the buffer duration from local memory, and rendering a subregion of the second video frame on a display arranged within the helmet; in response to detection of an accident involving the helmet, transitioning from the first mode into a second mode; in the second mode, capturing a second sequence of video frames, and storing the second sequence of video frames exceeding the buffer duration in local memory; and generating a video file from the first sequence of video frames and the second sequence of video frames stored in local memory.

U.S. Patent Application No. 2013/0276538 generally describes a non-powered impact recorder. The non-powered impact recorder includes a resonator tuned for a resonant response within a predetermined frequency range. A reduced cross-sectional area portion is formed within the resonator and configured to structurally fail when the resonator experiences the resonant response. Additionally, the non-powered impact recorder includes an electric circuit element disposed about the reduced cross-sectional area portion of the resonator. Upon structural failure of the resonator, the electric circuit element is broken to cause a discontinuity in the electric circuit element. Interrogation of the discontinuous electric circuit element facilitates approximation of impact frequency and/or impact energy.

U.S. Patent Application No. 2016/0037849 generally describes a helmet system that includes: a shell defining an interior volume and an aperture proximal an anterior end of the shell; a primary visor coupled to the shell and transiently arranged over the aperture; a secondary visor adjacent the aperture, including an elongated translucent member suspended from the shell, and defining a first discrete reflective region on a right side of the elongated translucent member and a second discrete reflective region on a left side of the elongated translucent member; a camera coupled to the shell and defining a field of view extending outwardly from a posterior end of the shell; and a projection system projecting an image onto the first discrete reflective region and onto the second discrete reflective region, the image comprising a subregion of a video frame recorded by the camera, the secondary visor reflecting the image toward the interior volume.

U.S. Patent Application No. 2016/0309827 generally describes a protective helmet that includes a protective shell, a visor, two rearward-mounted imagers, a display, and a processing system. The protective shell has an opening in front that is selectively covered by the visor and is configured to fit about the head of a user. The two imagers are mounted in substantially fixed positions on the rear of the protective shell so as to collectively provide a view of greater than 180 degrees about the rear of the protective shell. The processing system is operably associated with the two imagers and the at least one display, which displays real-time video from at least the left-most of the two imagers, as well as real-time video from the right-most imager or navigation, positioning, audio entertainment, or telephone call information. The helmet may further include a multi-level proximity alert system, an impact emergency alert system, and rechargeable power system.

None of the art described above addresses all of the issues that the present invention does.

SUMMARY OF THE EMBODIMENTS

According to an aspect of the present invention, a programmable electronic helmet is provided. The programmable electronic helmet includes a hard frame strappable to a head of a user, at least one gyroscope, an accelerometer, a visual user interface positioned a location that is in the peripheral field of vision of the user, wherein the visual user interface is configured to communicate information to the user, at least one camera positioned on the hard frame, and a wireless communication apparatus for connecting the programmable electronic helmet to one or more mobile electronic devices. The programmable electronic helmet further includes one or more processors, wherein the one or more processors are configured to analyze images captured by the at least one camera to approximate a location of one or more objects in an area surrounding the user, and a memory, coupled to the processor, configured to store data acquired by and sent to the programmable helmet.

According to another aspect of the present invention, a programmable electronic wearable protective covering is provided. The programmable electronic wearable protective covering includes at least one gyroscope, an accelerometer, a visual user interface positioned a location that is in the peripheral field of vision of the user, wherein the display is configured to communicate information to the user, at least one camera, one or more processors, wherein the one or more processors are configured to analyze images captured by the at least one camera to approximate a location of one or more objects in an area surrounding the user, and a memory, coupled to the processor, configured to store data acquired by and sent to the electronic wearable protective covering.

According to yet another aspect of the present invention, a non-transitory computer-readable storage medium including a computer-readable program for controlling an programmable electronic helmet is provided, wherein the computer-readable program when executed on the programmable electronic helmet causes the programmable electronic helmet to perform the steps of: receiving, via a wireless communication apparatus, a series of information from a mobile device; receiving, via one or more cameras coupled to the programmable electronic helmet, one or more video feeds of an area surrounding the user; determining, using one or more processors, an identity and location of one or more objects in the video feed; determining a velocity and an acceleration of the user using one or more gyroscopes and accelerometers; displaying, using a visual user interface, information to a user wearing the programmable electronic helmet, wherein the programmable electronic helmet is strapped to a head of the user.

It is an object of the present invention to provide for the programmable electronic helmet, wherein the visual user interface is positioned on an underside of a visor coupled to the hard frame.

It is an object of the present invention to provide for the programmable electronic helmet, wherein the visual user interface includes at least one series of red-green-blue (RGB) light emitting diodes (LEDs).

It is an object of the present invention to provide for the programmable electronic helmet, wherein the visual user interface communicates, to the user, information sent from one or more mobile electronic devices.

It is an object of the present invention to provide for the programmable electronic helmet, further including one or more lights coupled to an outside, front-facing edge of the hard frame.

It is an object of the present invention to provide for the programmable electronic helmet, wherein the visual user interface is configured to be customizedly programmed by the user.

It is an object of the present invention to provide for the programmable electronic helmet, further including one or more sensors configured to recognize one or more physical gestures and associate each of the one or more physical gestures with a function to be carried out by the one or more processors.

It is an object of the present invention to provide for the programmable electronic helmet, further including a set of lights configured to act as turn signals.

It is an object of the present invention to provide for the programmable electronic helmet, further including at least one microphone positioned on the helmet such that the microphone picks up speech from the user.

It is an object of the present invention to provide for the non-transitory computer-readable storage medium, wherein the computer-readable program when executed on the programmable electronic helmet causes the programmable electronic helmet to further perform the steps of: determining, using the one or more gyroscopes and accelerometers, when a velocity of the user is decreasing; and powering a stop light when the velocity of the user is decreasing.

It is an object of the present invention to provide for the non-transitory computer-readable storage medium, wherein the computer-readable program when executed on the programmable electronic helmet causes the programmable electronic helmet to further perform the steps of: determining, using the one or more cameras and the one or more processors, when a vehicle is approaching the user; and notifying the user when the vehicle is approaching and from approximately what direction the vehicle is approaching.

It is an object of the present invention to provide for the non-transitory computer-readable storage medium, wherein the computer-readable program when executed on the programmable electronic helmet causes the programmable electronic helmet to further perform the steps of: identifying, via one or more sensors coupled to the programmable electronic helmet, one or more physical gestures by the user; and performing a computer-executable function associated with each of the one or more physical gestures.

It is an object of the present invention to provide for the non-transitory computer-readable storage medium, wherein the computer-readable program when executed on the programmable electronic helmet causes the programmable electronic helmet to further perform the step of: receiving, via one or more microphones coupled to the programmable electronic helmet, an audio signal from a user; and identifying content of the audio signal.

It is an object of the present invention to provide for the non-transitory computer-readable storage medium, wherein the computer-readable program when executed on the programmable electronic helmet causes the programmable electronic helmet to further perform the step of: performing a computer-executable function associated with the content of the audio signal.

It is an object of the present invention to provide for the non-transitory computer-readable storage medium, wherein the computer-readable program when executed on the programmable electronic helmet causes the programmable electronic helmet to further perform the steps of: storing the one or more video feeds in a memory; and uploading the one or more video feeds to a wireless server.

It is an object of the present invention to provide for the non-transitory computer-readable storage medium, wherein the computer-readable program when executed on the programmable electronic helmet causes the programmable electronic helmet to further perform the steps of: storing, in a memory, all data gathered by the programmable electronic helmet over a predefined duration of time.

It is an object of the present invention to provide for the non-transitory computer-readable storage medium, wherein the computer-readable program when executed on the programmable electronic helmet causes the programmable electronic helmet to further perform the steps of: receiving a signal from the user to save, on a mobile electronic device, a portion of a trip taken by the user while wearing the programmable electronic helmet; and saving the portion of the trip to the mobile electronic device.

It is an object of the present invention to provide for the non-transitory computer-readable storage medium, wherein the wireless communication apparatus is a Bluetooth device.

DESCRIPTION OF THE PREFERRED EMBODIMENTS

Figure 1:
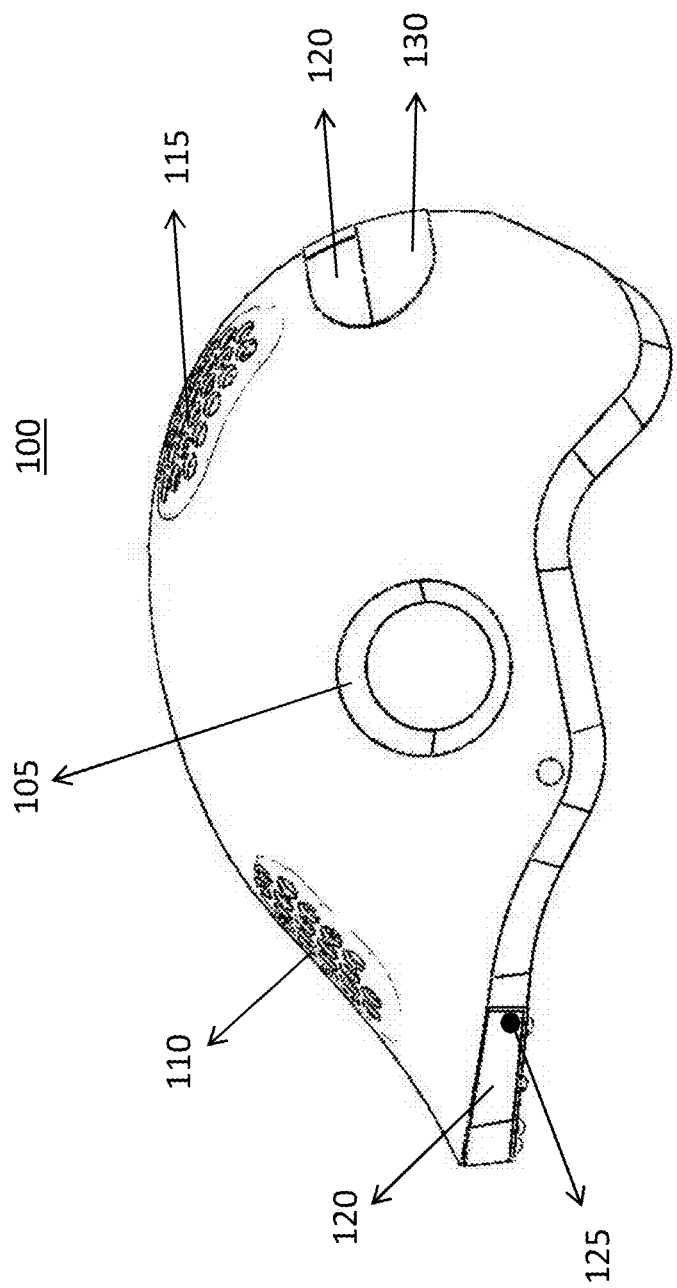
FIG. 1 shows a left side view of a programmable electronic helmet, according to an embodiment of the present invention.
Figure 2:
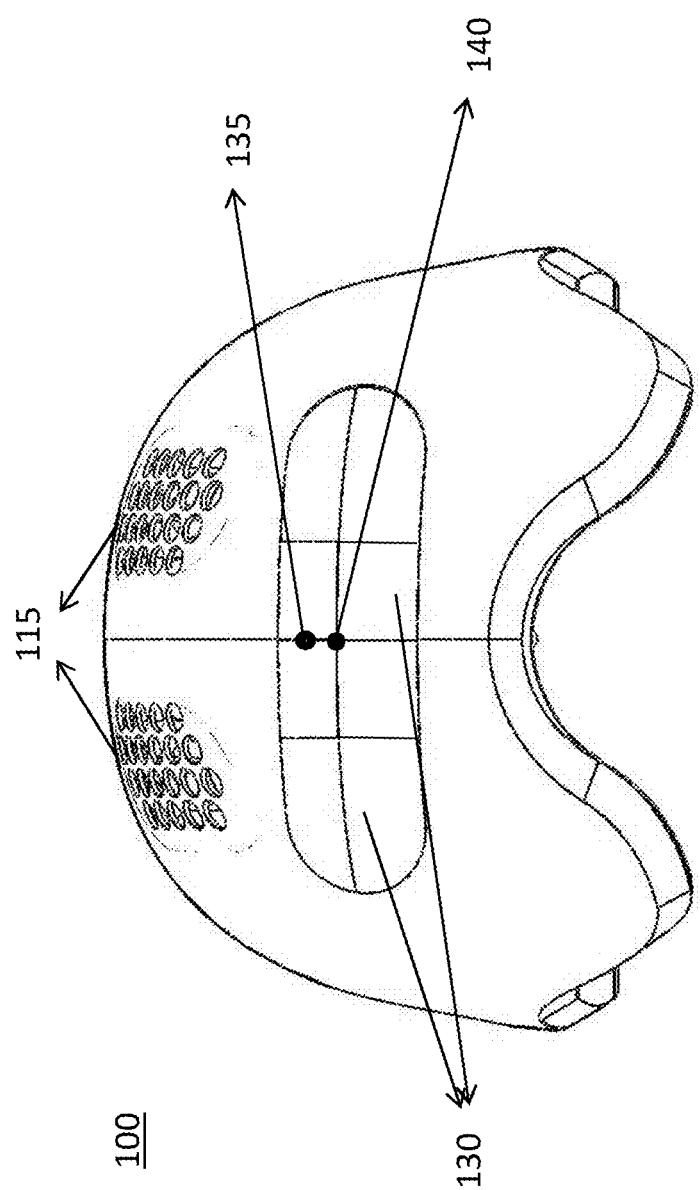
FIG. 2 shows a rear view of a programmable electronic helmet, according to an embodiment of the present invention.
Figure 3:
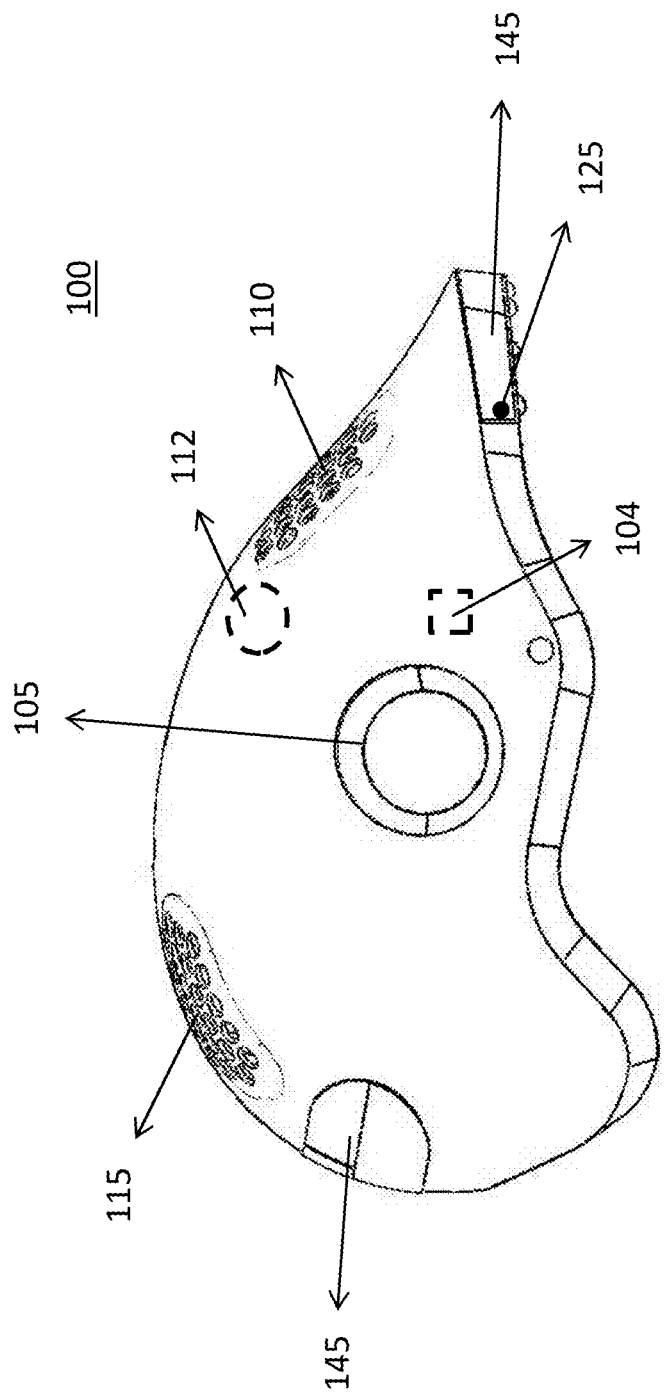
FIG. 3 shows a right side view of a programmable electronic helmet, according to an embodiment of the present invention.
Figure 4:
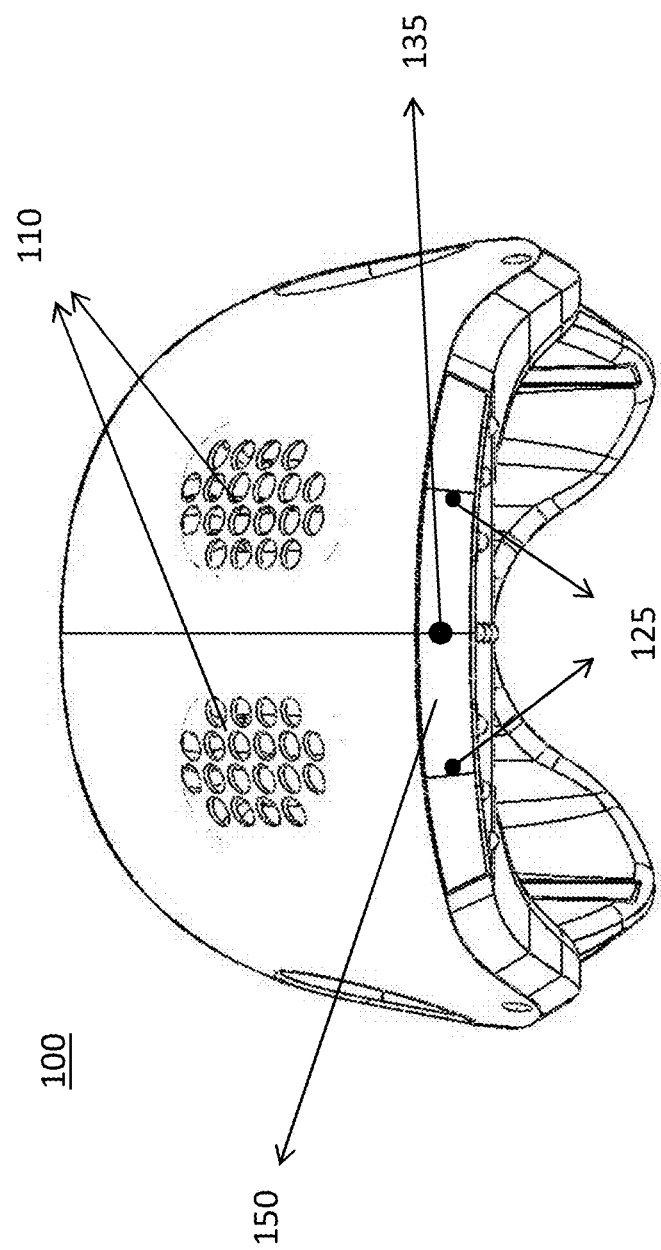
FIG. 4 shows a front view of a programmable electronic helmet, according to an embodiment of the present invention.
Figure 5:
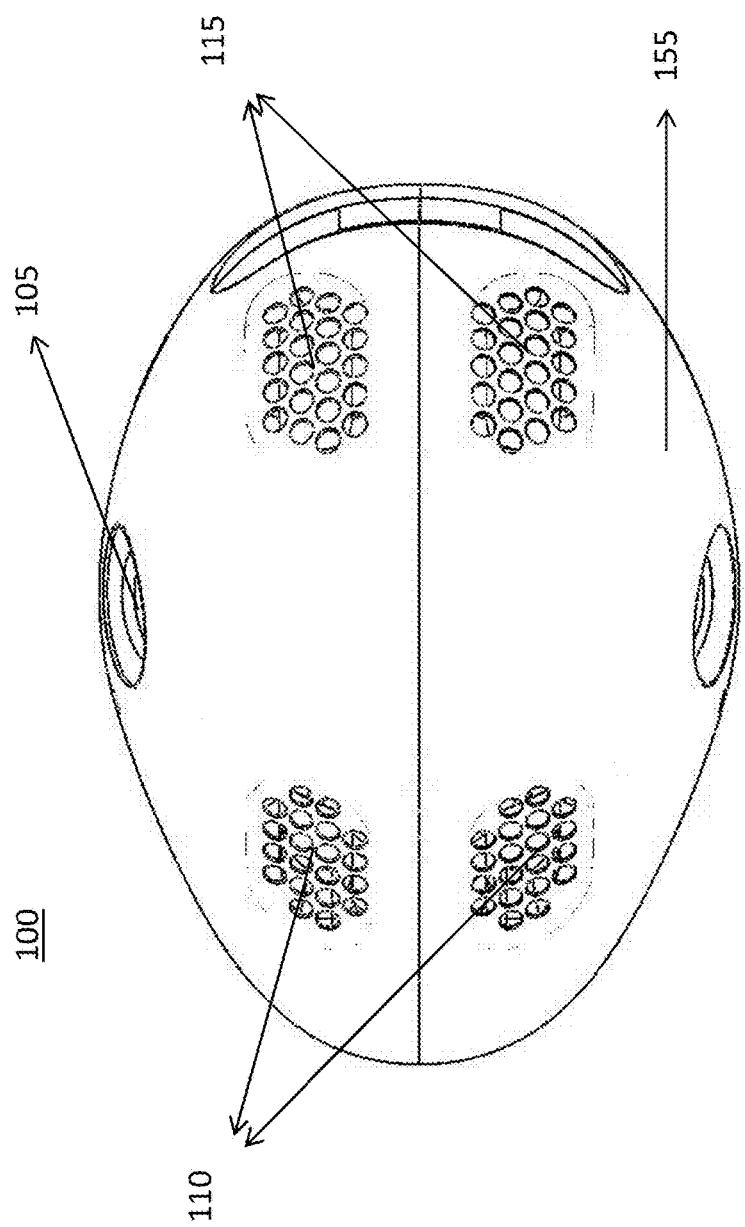
FIG. 5 shows a top view of a programmable electronic helmet, according to an embodiment of the present invention.
Figure 6:
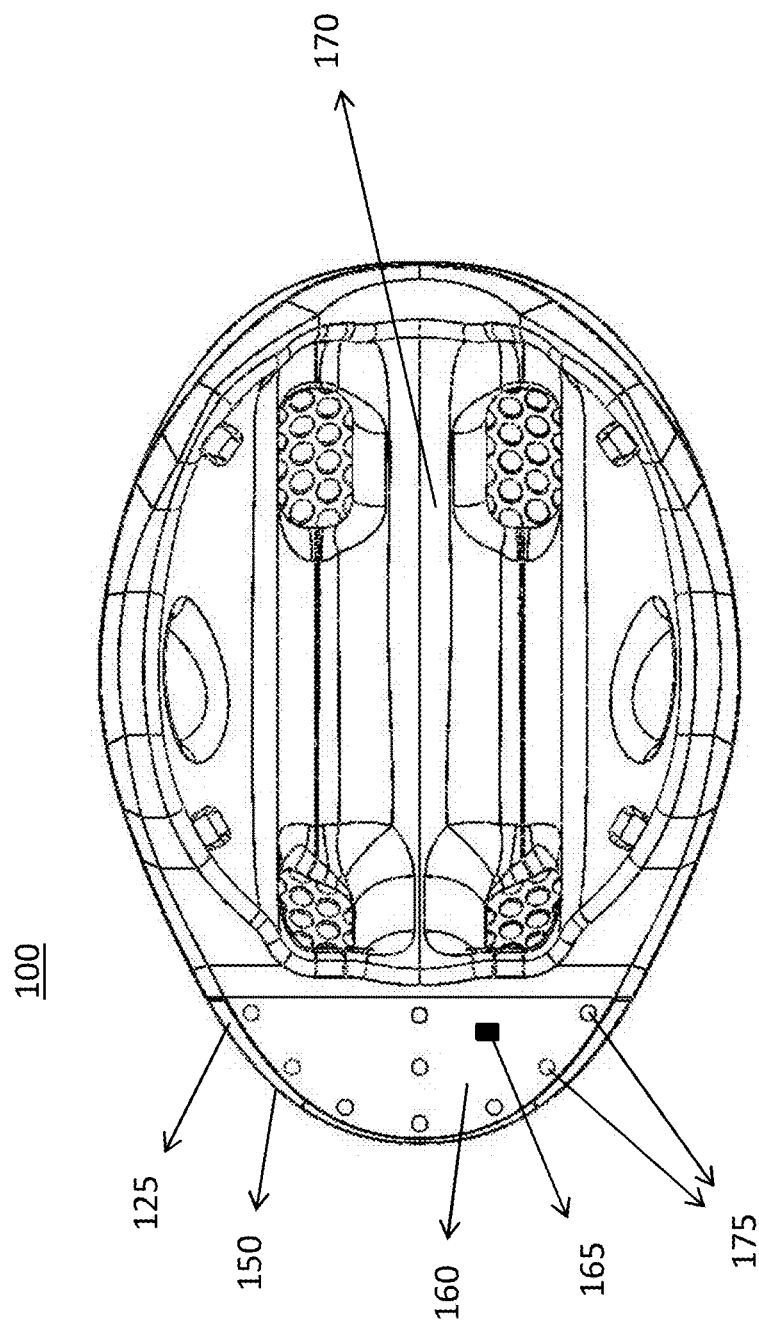
FIG. 6 shows a bottom view of a programmable electronic helmet, according to an embodiment of the present invention.
Figure 7:
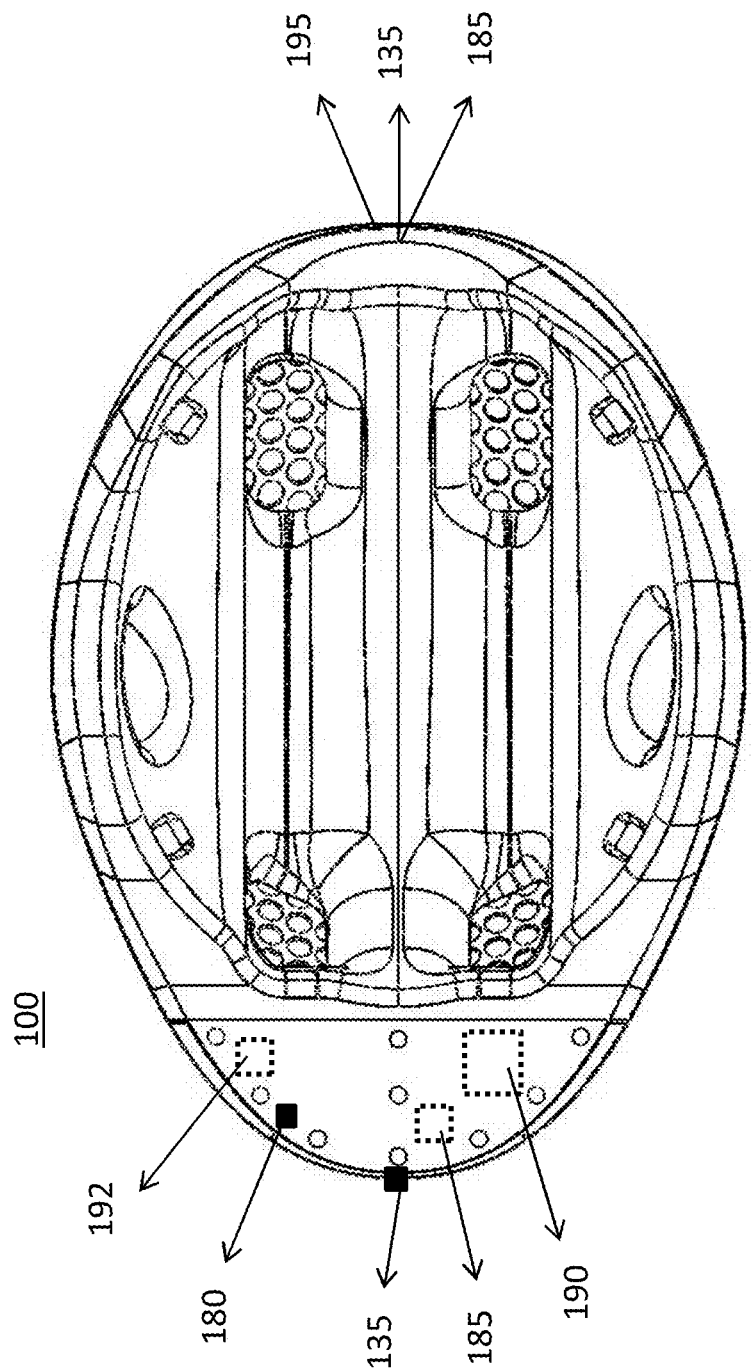
FIG. 7 shows a bottom view of a programmable electronic helmet, according to an embodiment of the present invention.
Figure 8:
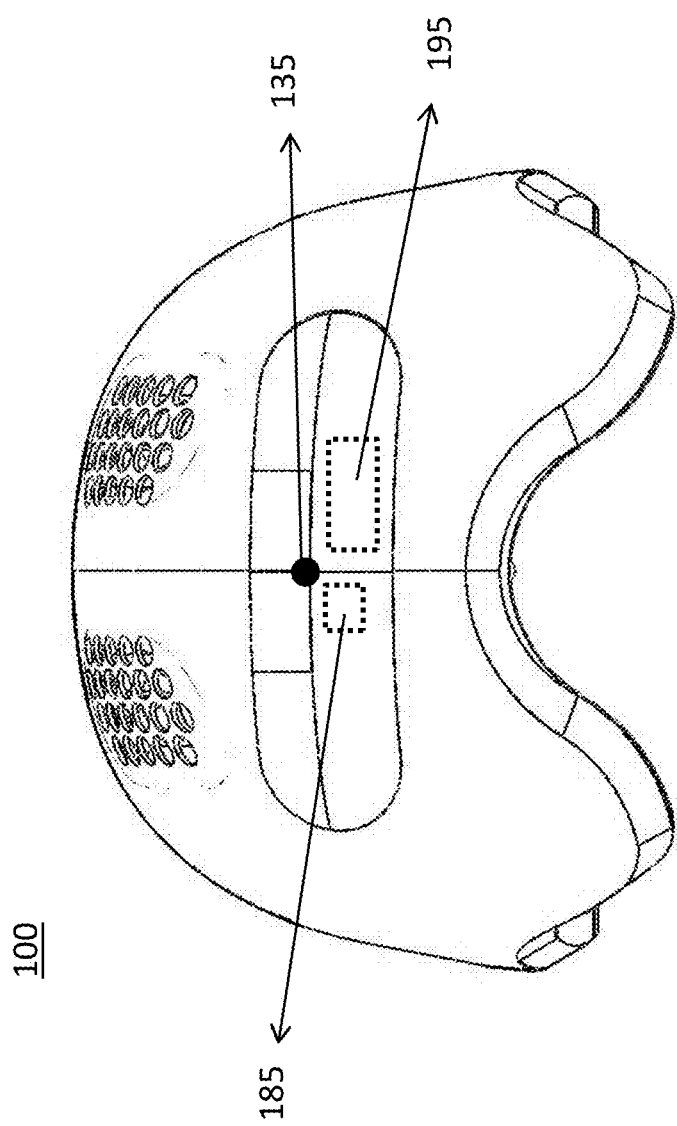
FIG. 8 shows a rear view of a programmable electronic helmet, according to an embodiment of the present invention.
Figure 9:
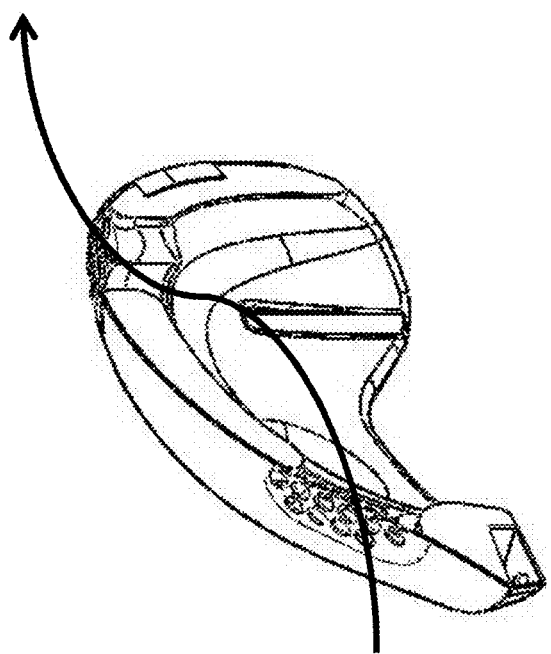
FIG. 9 shows air flow through a cross section of a front perspective view of a programmable electronic helmet, according to an embodiment of the present invention.
Figure 10:
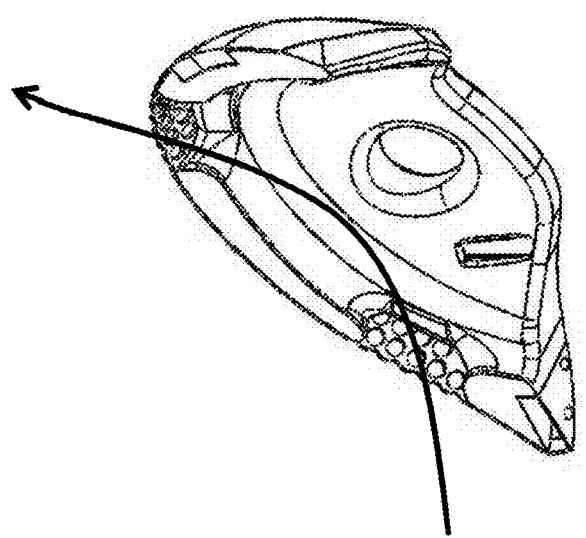
FIG. 10 shows air flow through a cross section of a bottom perspective view of a programmable electronic helmet, according to an embodiment of the present invention.
Figure 11:
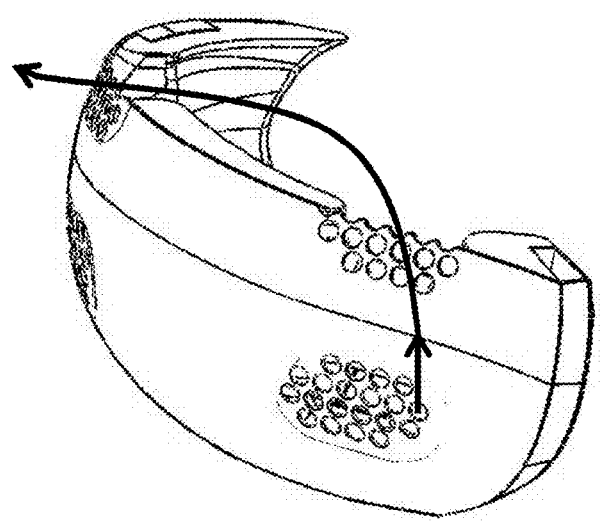
FIG. 11 shows air flow through a cross section of a front perspective view of a programmable electronic helmet, according to an embodiment of the present invention.
Figure 12:
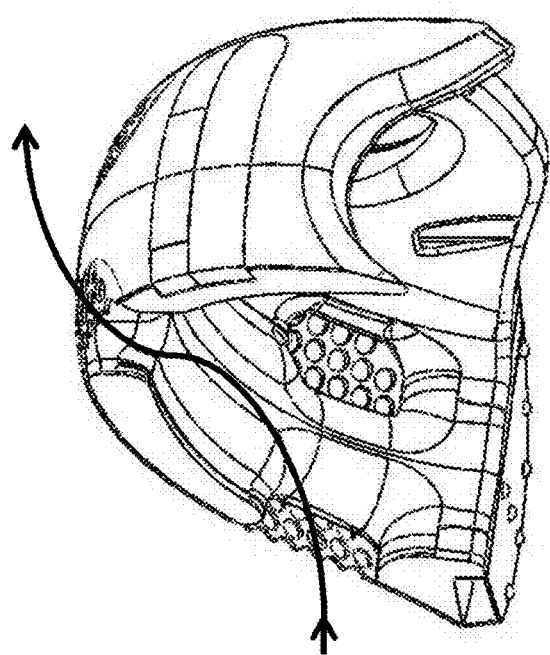
FIG. 12 shows air flow through a cross section of a rear perspective view of a programmable electronic helmet, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIGS. 1-8, a left side view (FIG. 1), rear views (FIGS. 2 and 8), a right side view (FIG. 3), a front view (FIG. 4), a top view (FIG. 5), and bottom views (FIGS. 6-7) of a programmable electronic helmet 100 are illustratively depicted, in accordance with various embodiments of the present invention.

Many bikes, when not in use, are chained or otherwise locked against an object. The programmable electronic helmet 100 includes one or more holes 105 of a sufficient diameter to enable a user to secure the helmet 100 with a locking mechanism. According to an embodiment, the one or more holes 105 may also serve as vents, aiding in cooling the user's head during wear of the helmet 100. It is noted that the helmet 100 may be used for purposes other than of transportation, such as, but not limited to, a helmet or other type of hard hat for construction workers. The helmet may also be used for other fields in which helmets may be used.

According to an embodiment, the helmet 100 includes a plurality of vents (one or more front vents 110 and one or more rear vents 115). This plurality of vents 110, 115 enables air to flow through the helmet 100 in the space between the helmet 100 and the head of the user, aiding in the cooling of the helmet 100.

According to an embodiment, the programmable electronic helmet 100 includes one or more cameras 135 positioned on an outer surface of the helmet 100. These cameras 135 capture video streams of the area surrounding the user. According to an embodiment, the cameras 135 are positioned in a front and back configuration. However, any suitable configuration of one or more cameras 135 may be used. According to an embodiment, a camera 135 rig that enables 360 degrees of recording is employed.

According to an embodiment, computer vision is used to analyze video from the cameras 135 in real-time. The cameras 135 capture the video as a raw data file. According to an embodiment, the raw data file is translated into JPEG on a rate between 1-56 frames per second. According to an embodiment, a processor 185 located within the helmet 100 analyzes the translated file at an average rate of approximately 1-25 frames per second.

According to an embodiment, one or more processors 185 analyze the video feeds from the one or more cameras 135, using an algorithm, to identify one or more objects within the video feed and the location of each of those objects. According to an embodiment, the algorithm searches for shapes that represent a car such as, e.g., a rectangle shape, headlights, license plates, wheels etc. The algorithm can also be used to recognize other objects, such as, e.g., motorcycles, bicycles, pedestrians etc.

According to an embodiment, as part of the process of identifying the objects within the video feed, the algorithm stabilizes the images, defines the horizon, and defines the perspective lines that determines the street/road so that it can position the rider to the left or right of the road. According to some embodiments, other filters are applied, such as, e.g., night vision, high contrast, high pixilation, etc. According to some embodiments, the resolution of the images is lowered.

According to an embodiment, the algorithm analyzes the movement of an object from the video feed. This enables the algorithm to determine whether an object, such as a car, is approaching the user. Once the algorithm detects a car, or any other objects, it only warns the user if the object is approaching (moving towards the user at an equal or greater speed). The algorithm may also determine unmoving objects for the user to avoid such as, e.g., parked automobiles, trees, buildings, potholes, etc.

Depending on which side of the road the object is approaching, the user is warned by a light on that side, on a display or on a light array 175, or with a speaker 165, coupled to the helmet 100, by a specific sound or spoken words or by a vibration, or by a combination of one or more of these methods. According to an embodiment, the speaker and microphone 165 are a singular device. According to another embodiment, the speaker and microphone 165 are separate devices. The speaker and microphone 165 may be any suitable type of speaker and microphone.

The video feed, and any associated sound recordings from the microphone 165, is recorded and stored in the helmet 100. According to an embodiment, when the helmet 100 locates a known Wi-Fi network, the helmet connects automatically and uploads the video to the cloud. The user then can access this video via an application on a mobile device, or via a web browser. The user also has the ability to livestream from a phone or other mobile device using the cameras 135 of the helmet 100.

According to an embodiment, the user can save a memory or bookmark a moment that is recorded using the helmet 100. While riding, the user my want to save a particular segment of the trip. By signaling the helmet 100 to save a memory or bookmark a moment, the user may save a range between 1 to 300 seconds prior and/or after the moment of the bookmark. The lengths of the bookmark can be set by the user. The signal may be, e.g., tapping on the infrared sensors 125, saying a voice command, moving a body part, etc. The bookmark is automatically saved on the phone or other connected mobile device so the user can access it quickly.

According to an embodiment, the helmet further includes one or more gyroscopes/accelerometers 112. These one or more gyroscopes/accelerometers 112 are configured to determine a user's velocity and/or changes in the user's acceleration, velocity, and/or angle. Upon detection of a decrease in the velocity of the user, one or more brake lights 130 on the rear side of the helmet 100 are automatically actuated in order to signal to anyone behind the user that the user is braking.

According to an embodiment, the helmet 100 further includes one or more (infrared) gesture sensors 125. The gesture sensors 125 detect arm movement from the user to indicate a turn and automatically turn on the turning lights (one or more left turning lights 120 and one or more right turning lights 145) upon the detection of the movement. Turn lights can also be actuated by voice commands, using the incorporated microphone 165, or by moving the head in pattern using the gyroscope/accelerometer 112. The helmet 100 may also be programmed to perform other functions that are assigned to specific movements, gestures, and/or sounds.

According to an embodiment, the turning lights 120, 145 may also function as flashing hazard lights. According to another embodiment, the helmet 100 has hazard lights separate and apart from the turning lights 120, 145. According to an embodiment, the hazard lights turn on when the user taps on the programmable infrared sensors 125. According to an embodiment, the hazard lights come on automatically when a sudden stop is registered by the accelerometer/gyroscope 112. The hazard lights can also be actuated by voice commands, using the incorporated microphone 165, or by moving the head in pattern using the gyroscope/accelerometer 112. According to an embodiment, the helmet may also include front LEDs 150 which may be used for signaling and/or as a light-source.

According to an embodiment, the helmet 110 includes a storage memory 104. This storage memory 104 enables video and other information gathered by, or sent to, the helmet 100 to be stored therein.

According to an embodiment, the helmet 100 is battery 195 powered. The helmet may have a battery 195 and the ability to plug in a new battery 195 to extend its life. According to an embodiment, a USB or similar port 140 is used for charging the battery 195 in the helmet 100. According to an embodiment, the battery 195 in the helmet 100 is charged wirelessly. According to an embodiment, the helmet 100 further includes a switch or button 180 to turn the helmet 100 on and off.

According to an embodiment, one processor 185 per camera 135 is used within the helmet 100. According to another embodiment, one or more processors 185 are used to control all of the functions of the helmet 100.

According to an embodiment, the helmet 100 has the capability of communicating with one or more mobile electronic devices using a wireless communications apparatus 192. The wireless communication may be performed using BLE, BLE-Bluetooth, Bluetooth, NFC, DSRS, P2P, M2M, Wi-Fi, or other suitable wireless connectivity methods. According to an embodiment, the helmet 100 is connected to the user's mobile phone. According to an embodiment, the helmet includes a microcontroller 190 for controlling one or more functions of the helmet 100. The microcontroller 190 communicated with via a wireless or wired connection.

According to an embodiment, there is an application on the mobile phone that enables the user to send commands to the helmet 100 and/or send data from the helmet 100 to another location. According to an embodiment, multiple helmets 100 may interact with each other. According to an embodiment, any or all of the processing functions may be performed by the one or more processors 185 in the helmet 100, one or more mobile devices connected to the helmet 100, or any combination thereof.

According to an embodiment, the helmet 100 is able to perform one or more functions using the user's phone, such as placing a phone call. The user may signal the helmet 100 to place a phone call to a particular phone number. According to an embodiment, the user is able to program signals to have the helmet 100 dial certain contacts. During phone calls, the microphone and speaker 165 may be used.

A visual user interface 160 is coupled to the programmable electronic helmet 100 and positioned such that a user is able to identify what is being displayed on the visual user interface 160. According to an embodiment, the display consists of a series of red-green-blue (RGB) Light-Emitting Diodes (LEDs). However, any other form of display may also be used, such as, e.g., a video monitor, a projected image, etc. According to an embodiment, the visual user interface include an array of lights 175.

According to an embodiment, the visual user interface 160 is positioned on the underside of a visor and/or in any location on the programmable electronic helmet 100 that is not in the direct view of the user, such as in a location visible in the user's peripheral field of vision. Such a positioning of the visual user interface 160 would enable the visual user interface 160 to be seen by the user while not obstructing the vision of the user.

According to an embodiment, the visual user interface 160 lights up to communicate information to the user. According to an embodiment, the information displayed by the visual user interface 160 originates from a phone, a vehicle being ridden, other vehicles, a smart city, the programmable electronic helmet 100 itself, or any other suitable electronic device.

According to an embodiment, the visual user interface 160 is configurable and customizable. According to an embodiment, the user has access to the configurability and customizability of the visual user interface 160.

According to an embodiment, the programmable electronic helmet 100 is capable of warning a user of any possible obstructions (e.g., other vehicles, pedestrians, animals, etc.) that are in the user's blind spots. According to an embodiment, the programmable helmet 100 may also notify the user if the turning lights 120, 145 are on, what the battery 195 level is, that there is an incoming call, etc.

According to an embodiment, all data gathered by the helmet 100 is stored in the storage memory 104. This data may include, e.g., timestamp data, geolocation, audio, video, velocity, etc. This data can be used to determine the risk of the individual user who used that helmet 100 by using a combination of data points from the helmet 100 and phone. Using this data, it can be determined whether the user let his/her hands go while riding, if he/she rides between cars, rides on bike lanes when available, respects stop signs, respects red lights, etc. Furthermore, the video feed may also provide evidence in case of an accident, providing a record of what happened. This could lead to settling cases and lower insurance costs.

According to an embodiment, the data collected from multiple helmets 100 may be used to predict traffic patterns, accident patterns, and/or may also be used by companies, such as insurance companies, in determining insurance rates.

According to an embodiment, the body of the helmet includes PS Polystyrene. A hard frame or outer shell 155 may include ABS and/or Polycarbonate. In some cases the shell 155 could include aluminum and/or carbon fiber. In some configurations, the exterior and/or interior 170 of the helmet may have a lining of leather, vinyl or some fabric material, and may include polystyrene.

In some cases the exterior and/or interior will be covered with an easy to clean material like urethane or santoprene or similar elastomer or self-cleaning polymer coatings and anti-fogging surfaces.

The electronic housing is made of polycarbonate, acrylic, abs, polypropylene, or other material pertinent for the application.

Referring now to FIGS. 9-12, air flow patterns through a programmable electronic helmet 100 are shown in cross sections of a first front perspective view (FIG. 9), a bottom perspective view (FIG. 10), a second front perspective view (FIG. 11), and a rear perspective view (FIG. 12) of the programmable electronic helmet 100 are illustratively depicted, in accordance with various embodiments of the present invention.

The direction of the air flow through the vents is shown as a thick black line, with one or more arrows signifying the direction of the air flow through one or more vents and out one or more other vents.

Figure 13:
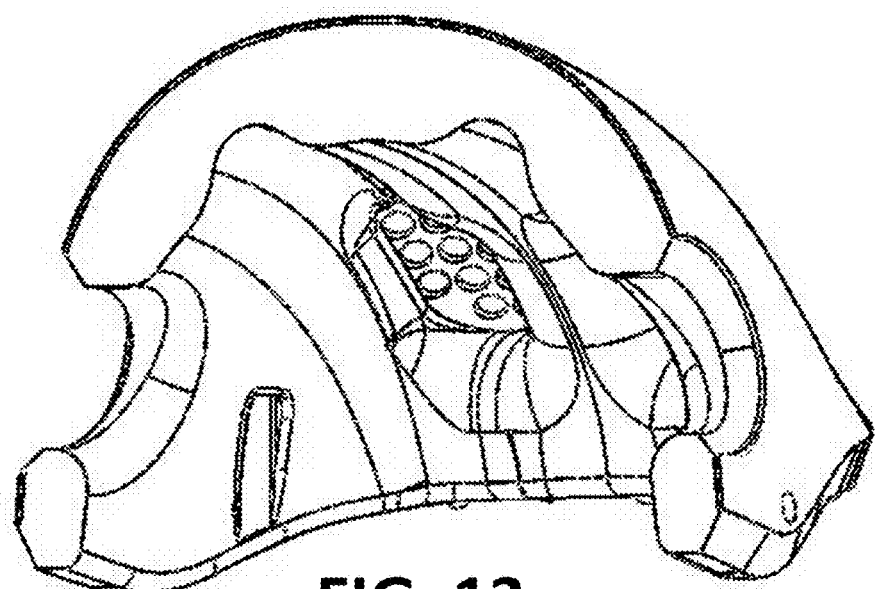
FIG. 13 shows a rear view vertical cross section of a programmable electronic helmet, according to an embodiment of the present invention.
Figure 14:
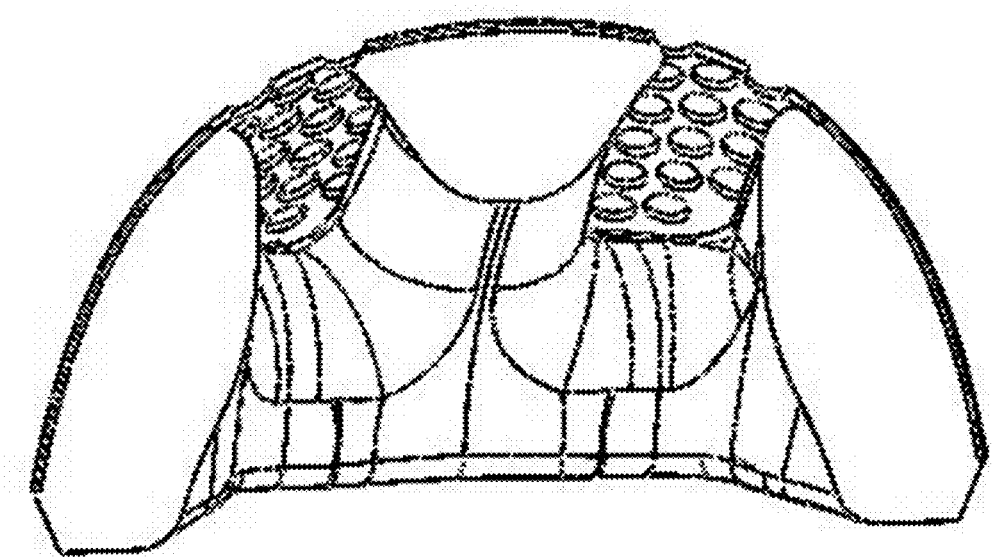
FIG. 14 shows a front view vertical cross section of a programmable electronic helmet, according to an embodiment of the present invention.
Figure 15B:
FIG. 15B shows a completed right side perspective view of a programmable electronic helmet, according to an embodiment of the present invention.
Figure 15D:
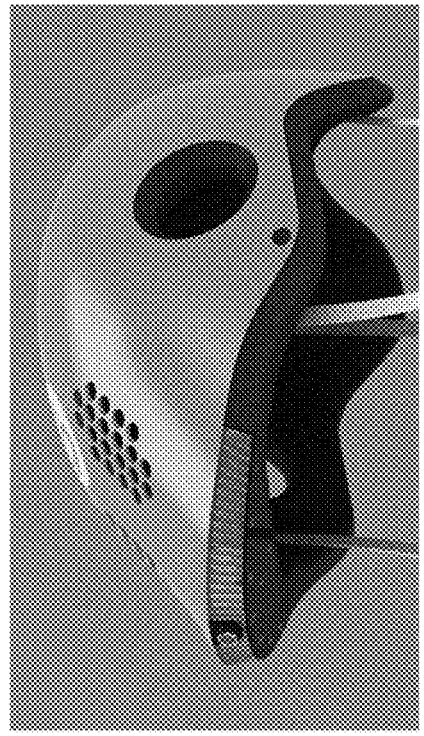
FIG. 15D shows a completed left side perspective view of a programmable electronic helmet, according to an embodiment of the present invention.
Figure 15A:
FIG. 15A shows a completed rear perspective view of a programmable electronic helmet, according to an embodiment of the present invention.
Figure 15C:
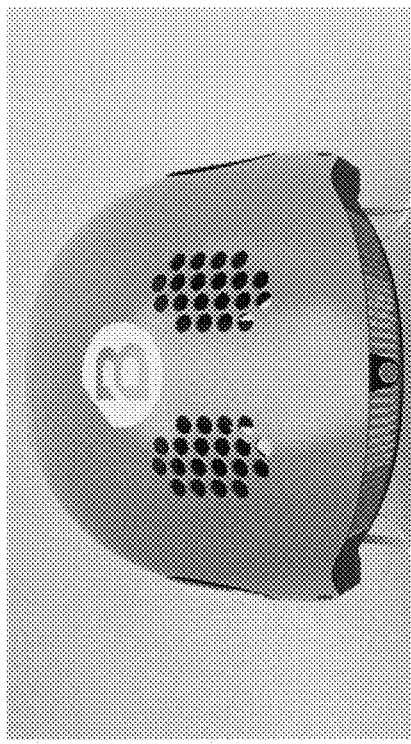
FIG. 15C shows a completed rear view of a programmable electronic helmet, according to an embodiment of the present invention.
Figure 15E:
FIG. 15E shows a completed front perspective view of a programmable electronic helmet, according to an embodiment of the present invention.

Referring now to FIGS. 13-14, a rear view vertical cross section (FIG. 13), and a front view vertical cross section (FIG. 14) of a programmable electronic helmet 100 are illustratively depicted, in accordance with various embodiments of the present invention.

The underside of the vents is shown, with the vents being recessed from the inner portion of the helmet 100, therefore creating a space between the vents and the head of the user.

Referring now to FIGS. 15A-15E, a completed rear perspective view (FIG. 15A), right side perspective view (FIG. 15B), rear view (FIG. 15C), left side perspective view (FIG. 15D), and front perspective view (FIG. 15E) of a programmable electronic helmet are illustratively depicted, in accordance with various embodiments of the present invention.

A strap is visibly attached to the helmet in FIGS. 15A-15E for securing the helmet to the head of a user.

Referring now to FIGS. 16-20, sreenshots on a mobile electronic device of an application to be used in conjunction with a programmable electronic helmet are illustratively depicted, in accordance with various embodiments of the present invention.

Figure 16:
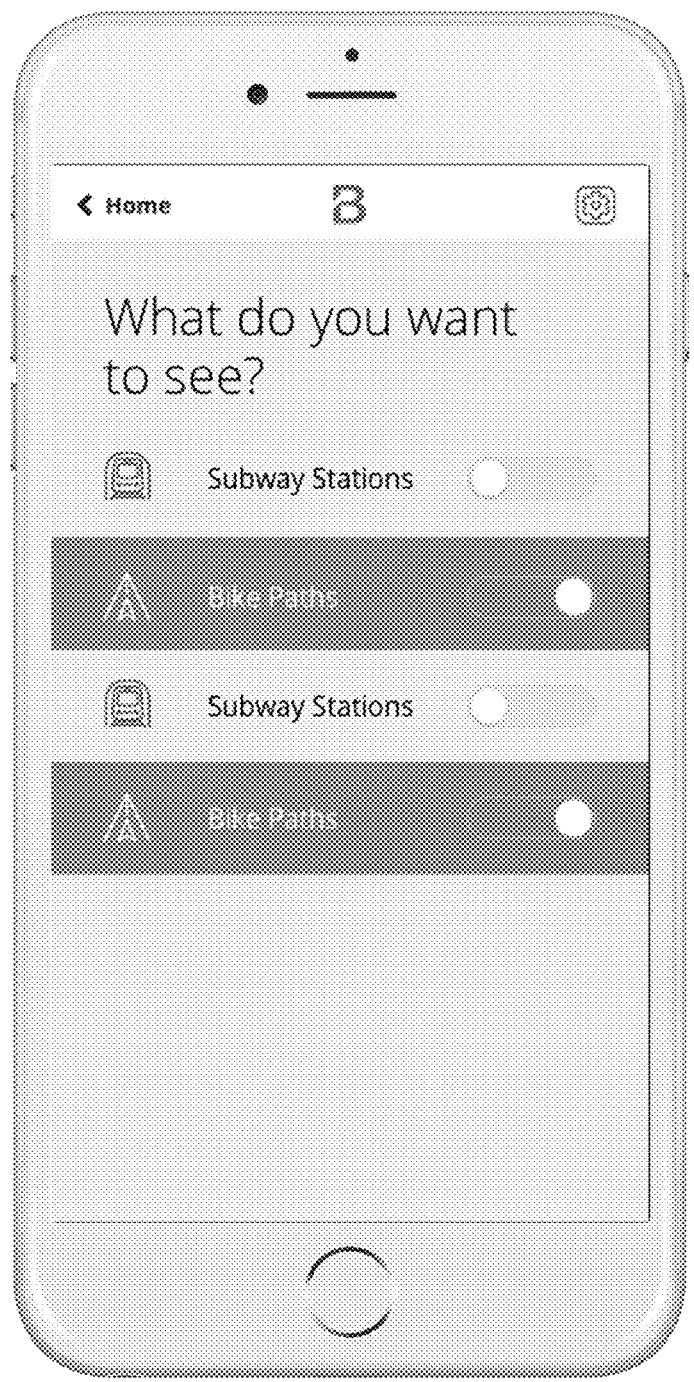
FIGS. 16-20 show sreenshots on a mobile electronic device of an application to be used in conjunction with a programmable electronic helmet, according to various embodiments of the present invention.

In the screenshot shown in FIG. 16, the user is instructed ("What do you want to see?") to selected what data points the user desires to see on a map. These data points can be, e.g., but not limited to, "Subway Stations," "Bike Parts," etc.

Figure 17:
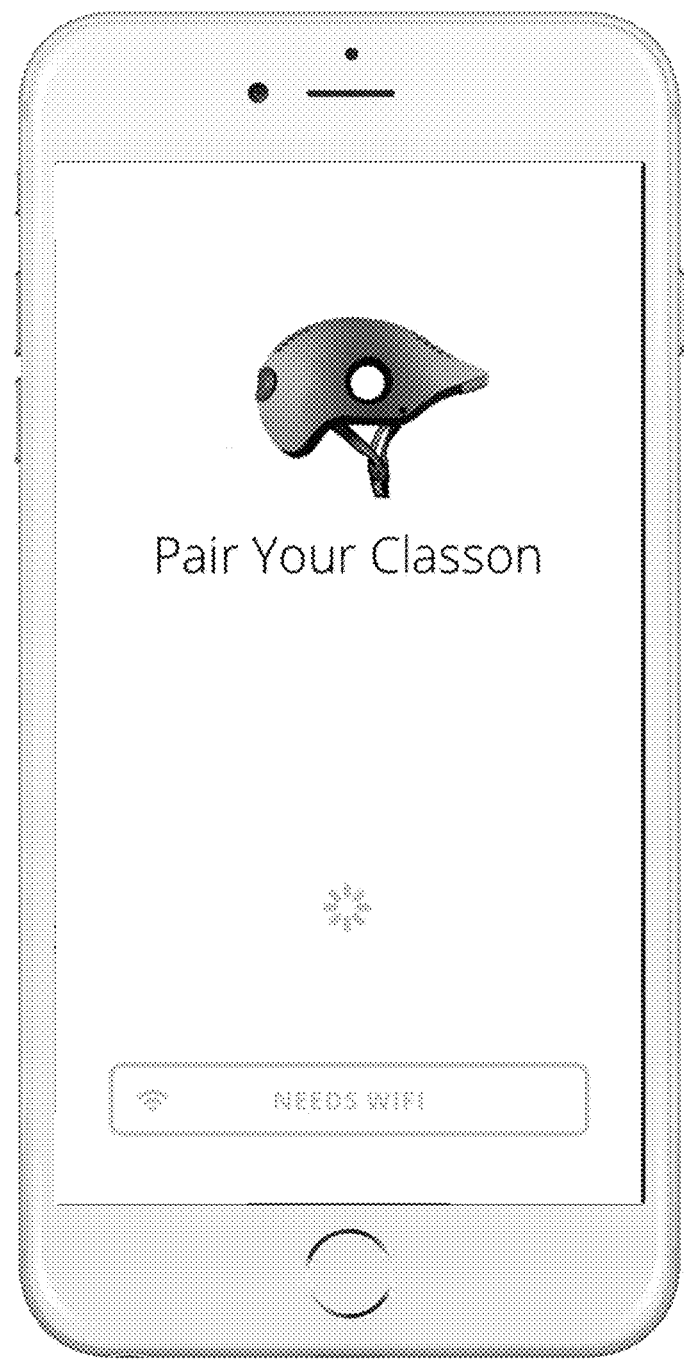

In the screenshot shown in FIG. 17, the user is instructed to pair a programmable electronic helmet with the application on the mobile electronic device.

Figure 18:
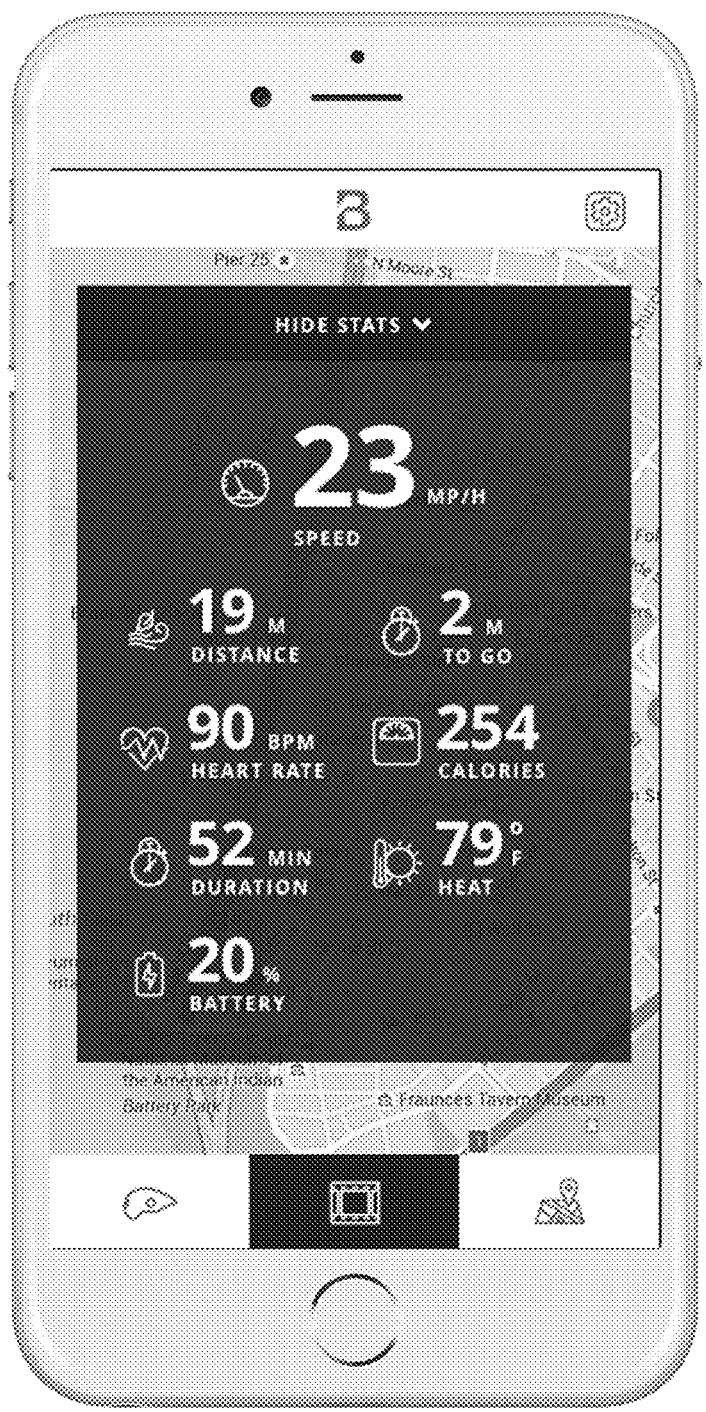

In the screenshot shown in FIG. 18, a user's current stats are shown for the user to see. These stats may include, but are not limited to, speed, distance, calories burned, duration of trip, temperature, information related to battery life, etc.

Figure 19:
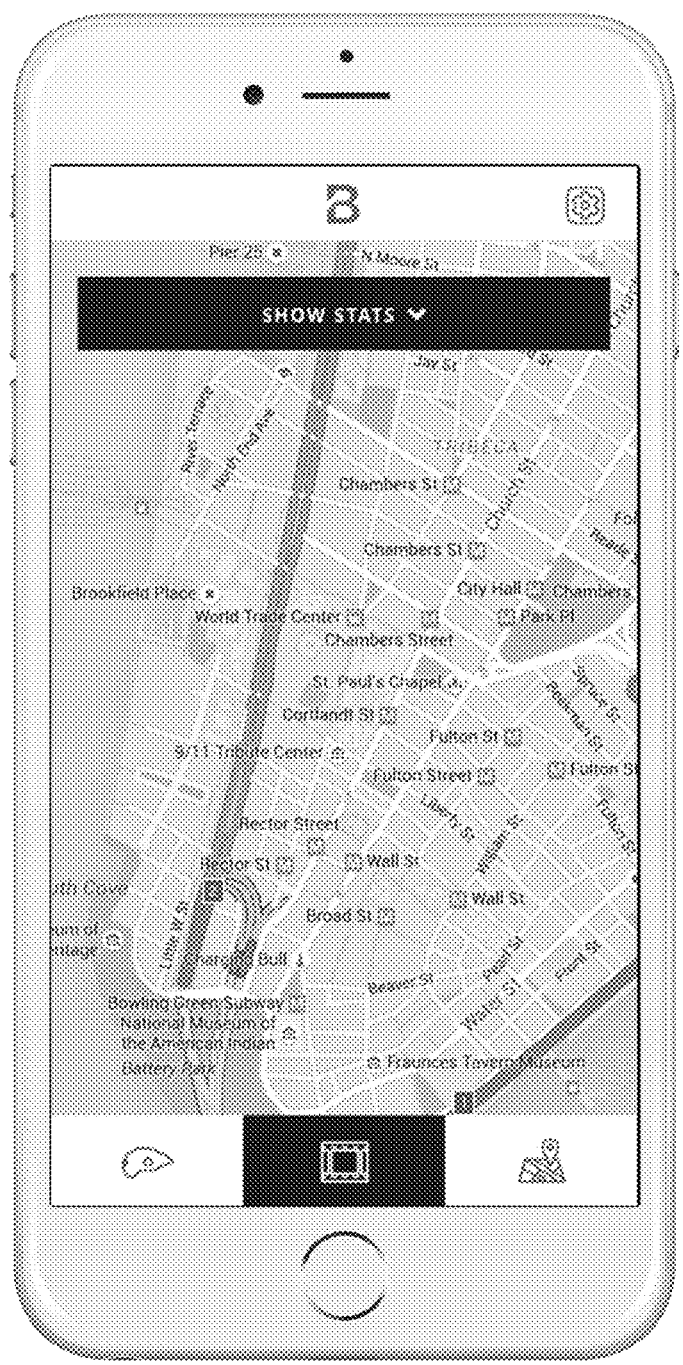

In the screenshot shown in FIG. 19, a map of a predetermined location is displayed on the mobile electronic device. According to an embodiment, the map is of an area surrounding the user. According to an embodiment, the map is of an area selected by the user. According to an embodiment, a path that the user took during a particular trip is displayed over the map.

Figure 20:
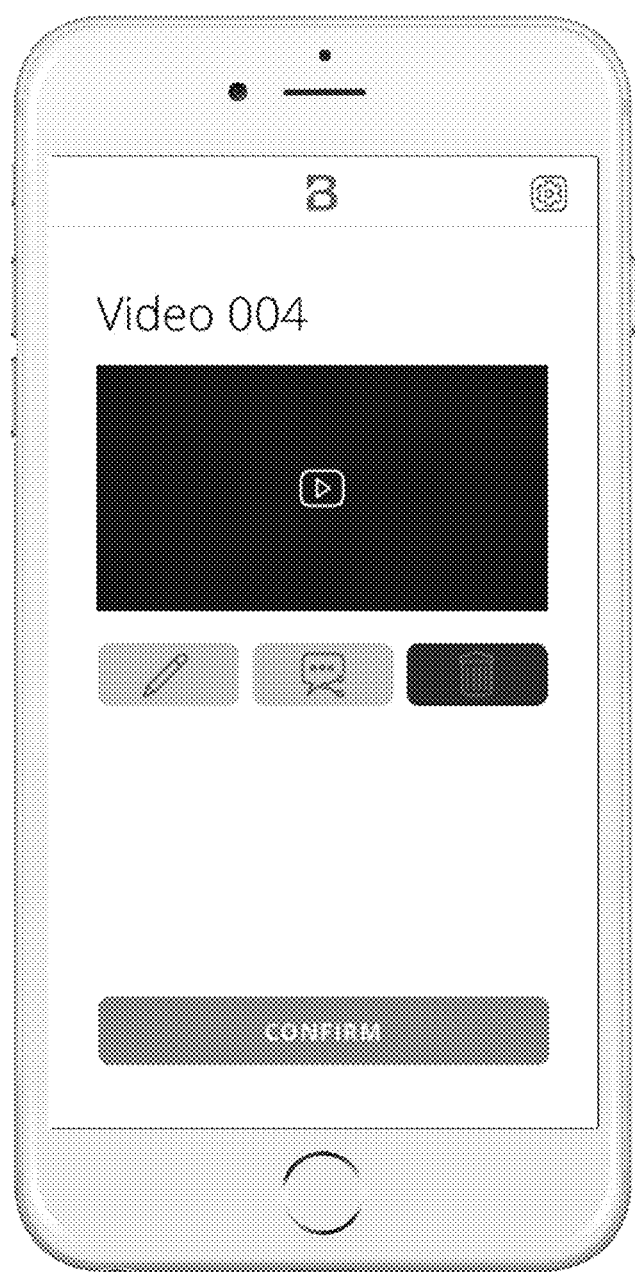

In the screenshot shown in FIG. 20, a video, recorded using one or more cameras on the programmable electronic helmet, is available for viewing by the user. According to an embodiment, the user is able to perform functions with the video, such as, but not limited, to, editing the video, tagging the video, deleting the video, sending the video, etc.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A programmable electronic helmet, comprising:
a hard frame strappable to a head of a user;
at least one gyroscope;
an accelerometer;
a visual user interface positioned a location that is in the peripheral field of vision of the user, wherein the visual user interface is configured to communicate information to the user;
at least one camera positioned on the hard frame;
a wireless communication apparatus for connecting the programmable electronic helmet to one or more mobile electronic devices;
one or more processors, wherein the one or more processors are configured to analyze images captured by the at least one camera to approximate a location of one or more objects in an area surrounding the user;
one or more infrared gesture sensors configured to detect appendage or head movement of the user which generates one or more left turning lights configured to signal that the user is preparing to turn left, and one or more right turning lights configured to signal that the user is preparing to turn right; and
a memory, coupled to the processor, configured to store data acquired by and sent to the programmable helmet.

2. The programmable electronic helmet at recited in claim 1, wherein the visual user interface is positioned on an underside of a visor coupled to the hard frame.

3. The programmable electronic helmet as recited in claim 1, wherein the visual user interface includes at least one series of red-green-blue (RGB) light emitting diodes (LEDs).

4. The programmable electronic helmet as recited in claim 1, wherein the visual user interface communicates, to the user, information sent from one or more mobile electronic devices.

5. The programmable electronic helmet as recited in claim 1, further comprising one or more lights coupled to an outside, front-facing edge of the hard frame.

6. The programmable electronic helmet as recited in claim 1, wherein the visual user interface is configured to be customizedly programmed by the user.

7. The programmable electronic helmet as recited in claim 1, further comprising one or more sensors configured to recognize one or more physical gestures and associate each of the one or more physical gestures with a function to be carried out by the one or more processors.

8. The programmable electronic helmet as recited in claim 1, further comprising at least one microphone positioned on the helmet such that the microphone picks up speech from the user.

9. A programmable electronic wearable protective covering, comprising:
at least one gyroscope;
an accelerometer;
a visual user interface positioned a location that is in the peripheral field of vision of a user, wherein the display is configured to communicate information to the user;
at least one camera;
one or more infrared gesture sensors configured to detect appendage or head movement of the user which generates one or more left turning lights configured to signal that the user is preparing to turn left, and one or more right turning lights configured to signal that the user is preparing to turn right;
one or more processors, wherein the one or more processors are configured to analyze images captured by the at least one camera to approximate a location of one or more objects in an area surrounding the user; and
a memory, coupled to the processor, configured to store data acquired by and sent to the electronic wearable protective covering.

10. A non-transitory computer-readable storage medium including a computer-readable program for controlling an programmable electronic helmet, wherein the computer-readable program when executed on the programmable electronic helmet causes the programmable electronic helmet to perform the steps of:
receiving, via a wireless communication apparatus, a series of information from a mobile device;
receiving, via one or more cameras coupled to the programmable electronic helmet, one or more video feeds of an area surrounding the user;
determining, using one or more processors, an identity and location of one or more objects in the video feed;
determining a velocity and an acceleration of the user using one or more gyroscopes and accelerometers; and
displaying, using a visual user interface, information to a user wearing the programmable electronic helmet,
detecting, using one or more infrared gesture sensors, appendage or head movement of the user;
if the user is preparing to turn left, indicating, using one or more left turning lights, that the user is preparing to turn left; and
if the user is preparing to turn right, indicating, using one or more left turning lights, that the user is preparing to turn right;
wherein the programmable electronic helmet is strapped to a head of the user.

11. The non-transitory computer-readable storage medium as recited in claim 10, wherein the computer-readable program when executed on the programmable electronic helmet causes the programmable electronic helmet to further perform the steps of:
determining, using the one or more gyroscopes and accelerometers, when a velocity of the user is decreasing; and
powering a stop light when the velocity of the user is decreasing.

12. The non-transitory computer-readable storage medium as recited in claim 10, wherein the computer-readable program when executed on the programmable electronic helmet causes the programmable electronic helmet to further perform the steps of:
determining, using the one or more cameras and the one or more processors, when a vehicle is approaching the user; and
notifying the user when the vehicle is approaching and from approximately what direction the vehicle is approaching.

13. The non-transitory computer-readable storage medium as recited in claim 10, wherein the computer-readable program when executed on the programmable electronic helmet causes the programmable electronic helmet to further perform the steps of:
identifying, via one or more sensors coupled to the programmable electronic helmet, one or more physical gestures by the user; and
performing a computer-executable function associated with each of the one or more physical gestures.

14. The non-transitory computer-readable storage medium as recited in claim 10, wherein the computer-readable program when executed on the programmable electronic helmet causes the programmable electronic helmet to further perform the step of:
 receiving, via one or more microphones coupled to the programmable electronic helmet, an audio signal from a user; and
 identifying content of the audio signal.

15. The non-transitory computer-readable storage medium as recited in claim 14, wherein the computer-readable program when executed on the programmable electronic helmet causes the programmable electronic helmet to further perform the step of:
 performing a computer-executable function associated with the content of the audio signal.

16. The non-transitory computer-readable storage medium as recited in claim 10, wherein the computer-readable program when executed on the programmable electronic helmet causes the programmable electronic helmet to further perform the steps of:
 storing the one or more video feeds in a memory; and
 uploading the one or more video feeds to a wireless server.

17. The non-transitory computer-readable storage medium as recited in claim 10, wherein the computer-readable program when executed on the programmable electronic helmet causes the programmable electronic helmet to further perform the steps of:
 storing, in a memory, all data gathered by the programmable electronic helmet over a predefined duration of time.

18. The non-transitory computer-readable storage medium as recited in claim 10, wherein the computer-readable program when executed on the programmable electronic helmet causes the programmable electronic helmet to further perform the steps of:
 receiving a signal from the user to save, on a mobile electronic device, a portion of a trip taken by the user while wearing the programmable electronic helmet; and
 saving the portion of the trip to the mobile electronic device.

19. The non-transitory computer-readable storage medium as recited in claim 10, wherein the wireless communication apparatus is a Bluetooth device.

\* \* \* \* \*